United States Patent [19]

Edman

[11] Patent Number: 5,435,246

[45] Date of Patent: Jul. 25, 1995

[54] IDENTIFICATION STAMP FOR COMPACT DISCS

[75] Inventor: Frederick C. Edman, Los Angeles, Calif.

[73] Assignee: Pro-Tec Systems, Los Angeles, Calif.

[21] Appl. No.: 261,718

[22] Filed: Jun. 17, 1994

[51] Int. Cl.⁶ ............................................. B41K 1/42
[52] U.S. Cl. ............................ 101/333; 101/35; 206/224
[58] Field of Search ............... 101/103, 104, 109, 125, 101/327, 333, 368, 35, 41, 369; 206/224; 264/107

[56] References Cited

U.S. PATENT DOCUMENTS

| | | | |
|---|---|---|---|
| 3,045,593 | 7/1962 | Petterson | 101/368 |
| 4,996,921 | 3/1991 | Hong | 101/333 |
| 5,014,617 | 5/1991 | Lesyk | 101/333 |
| 5,165,340 | 11/1992 | Karlyn et al. | 101/35 |
| 5,313,881 | 5/1994 | Morgan | 101/4 |
| 5,320,219 | 6/1994 | Ward | 101/23 |
| 5,375,515 | 12/1994 | Morgan | 101/4 |

FOREIGN PATENT DOCUMENTS

| | | | |
|---|---|---|---|
| 079990 | 5/1985 | Japan | 101/333 |
| 162684 | 8/1985 | Japan | 101/327 |
| 114770 | 5/1991 | Japan | 101/333 |

Primary Examiner—Ren Yan
Attorney, Agent, or Firm—Natan Epstein

[57] ABSTRACT

A kit for applying stamping identification onto compact discs includes a base for supporting a compact disc, and a hand stamp with a spring loaded spindle sized to fit into a hole in the base for centering the stamp relative to the disc. The spring force on the spindle must be manually overcome to apply the stamp to the disc and helps maintain uniformity of stamping force. The stamp assembles with an inkwell unit for clean and convenient storage of both stamp and inkwell.

15 Claims, 3 Drawing Sheets

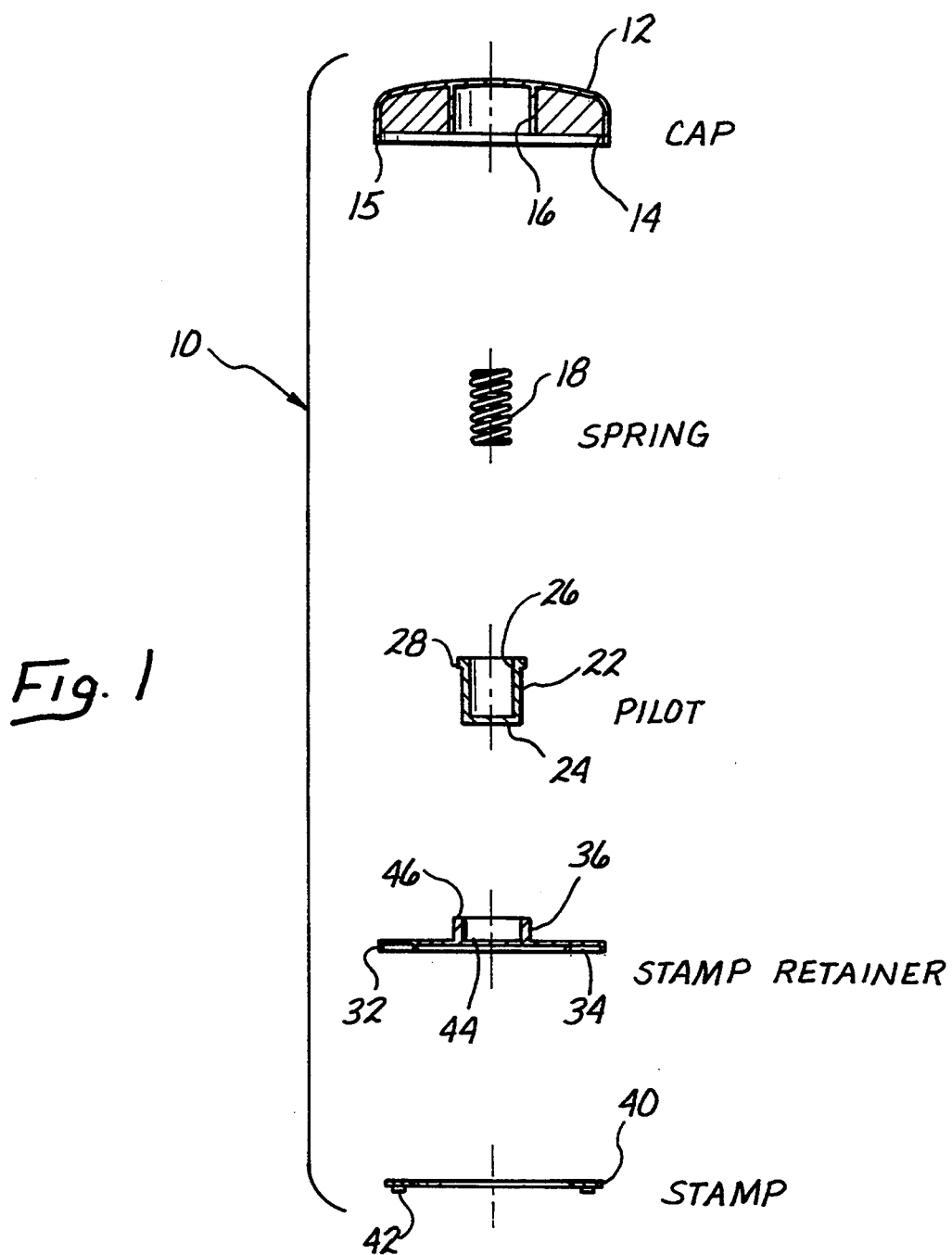
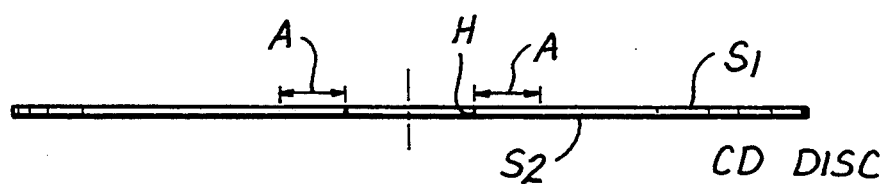
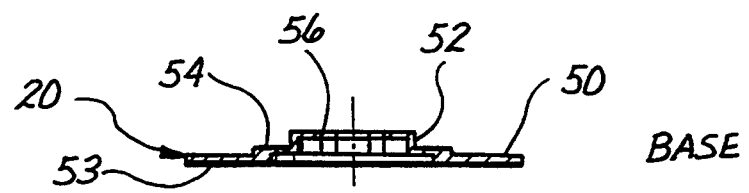
Fig. 1

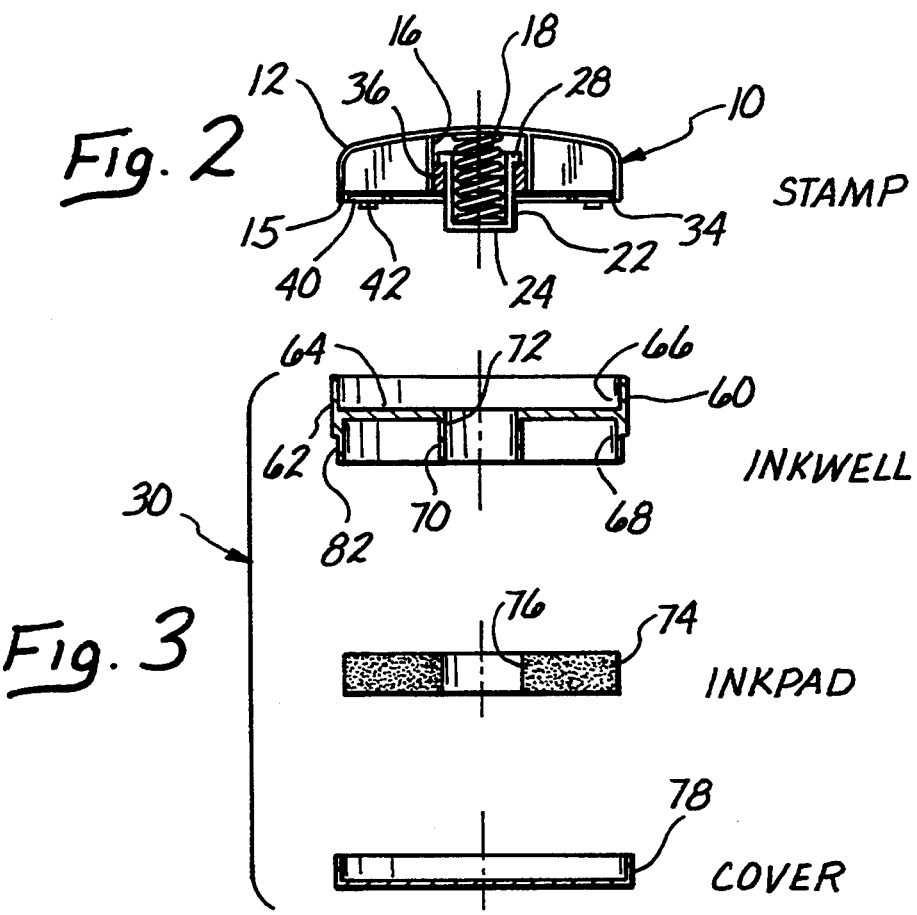
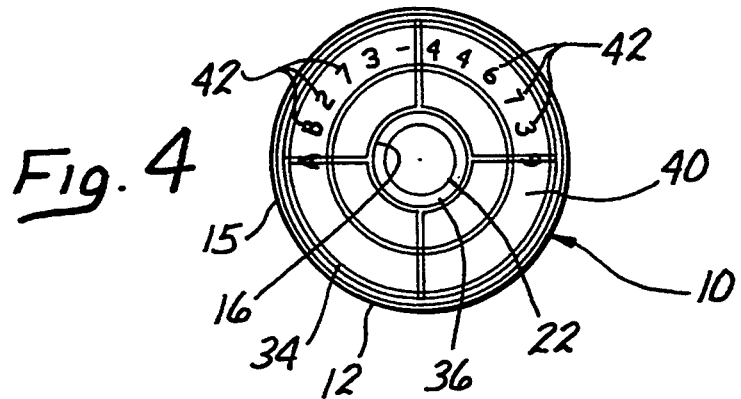
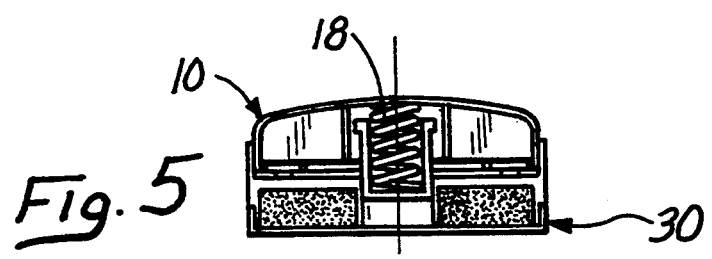

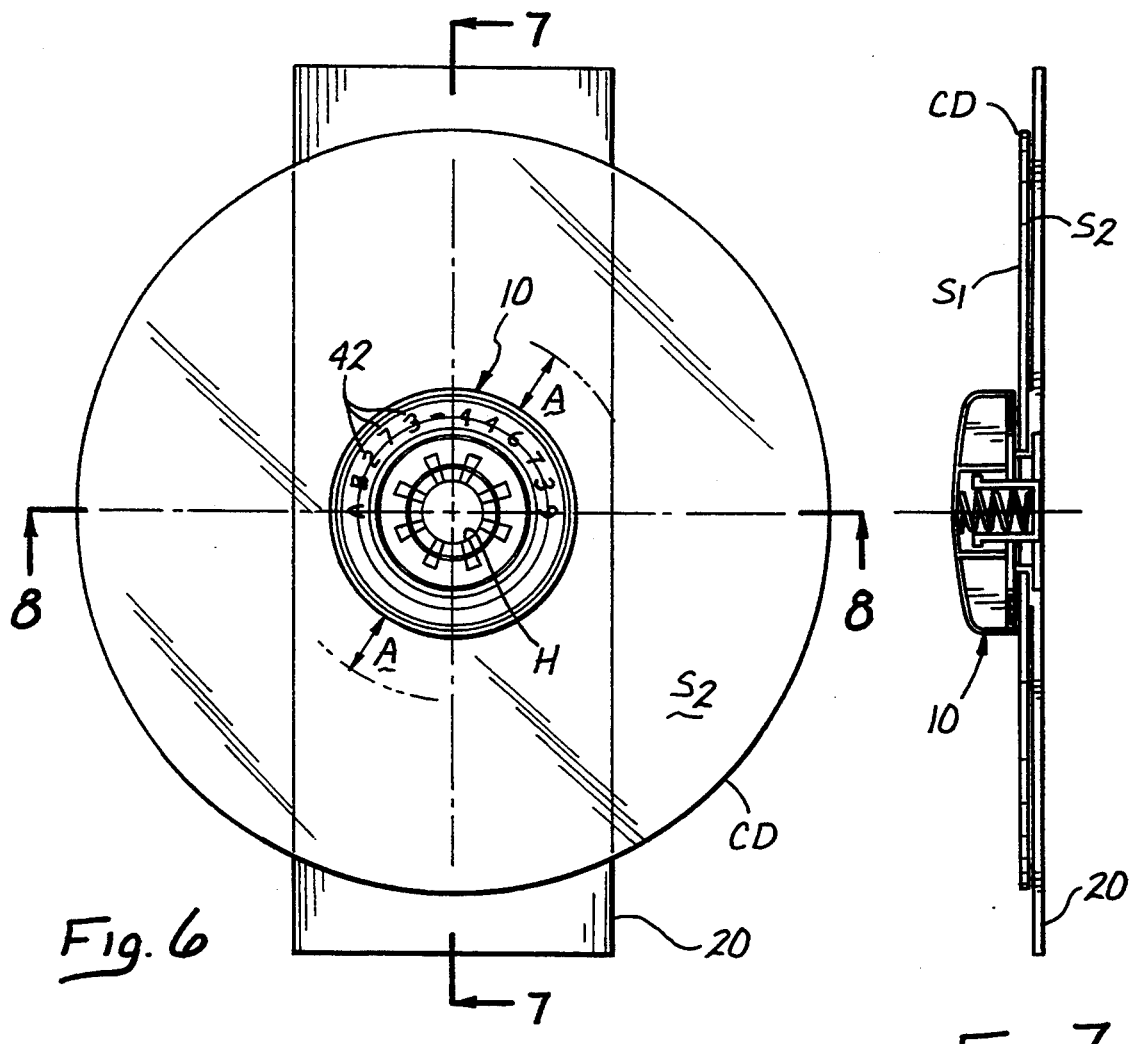
Fig. 6
Fig. 7
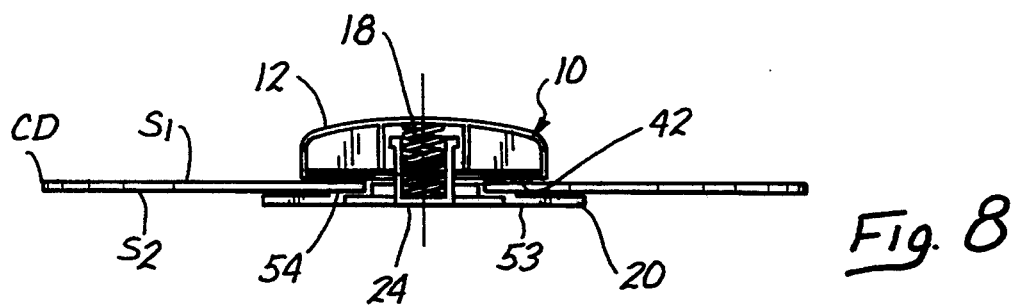
Fig. 8

IDENTIFICATION STAMP FOR COMPACT DISCS

BACKGROUND OF THE INVENTION

1. Field of the Invention

This invention relates to manual stamping devices for use in applying identifying markings to personal property, and in particular for applying identifying markings to compact discs.

2. State of the Prior Art

Compact discs as a recording medium for music and now increasingly for computer readable data and video are characterized by their durability and immunity from wear in normal usage. Unless abused, the recordings on such discs do not degrade, unlike vinyl disc recordings which have been obsoleted and virtually replaced by compact discs. This characteristic has created a large and rapidly growing market for previously owned or second hand compact discs. Increasingly, major music retail chains offer previously owned compact discs for resale at substantial discounts over new discs. The musical quality and data integrity of the lower cost, second hand discs is normally indistinguishable from new, unused discs.

The ready marketability of second hand compact discs also makes them easy and attractive targets for theft. The discs are commonly found in automobiles which increasingly are equipped with CD players, providing many opportunities for theft of the discs. Home collections of CD's are also vulnerable, and music store stocks are frequently subject to shoplifting.

Compact discs as presently sold have no identifying indicia which are useful in screening for stolen discs when offered for resale. What is needed is a device which can be used for quickly and easily applying a unique identification marking or code to each compact disc and serving to positively identify the owner or source of the disc if the disc is stolen and subsequently either recovered or offered for sale to a dealer. Such a device must be inexpensive, of simple and reliable construction, and easy to use by technically unskilled persons. No such device is known to be available.

SUMMARY OF THE INVENTION

This invention addresses the aforementioned need by providing an identification stamp and a stamp kit for use on compact discs. The invention may include three components: a stamping unit, a base and an inkwell. The base supports a compact disc during the stamping operation on a hub sized to make a close fit in the center opening normally present in compact discs, the hub also having a center hole. The stamping unit has a cap, a stamp element on an underside of the cap and a pilot spindle extending from the stamp element, the spindle being sized to make a close fit into the center hole of the hub on the base, so that the stamping unit is positively centered relative to the disc by inserting the spindle into the center hole of the hub prior to pressing the stamp element against the compact disc for making an identifying impression.

The pilot spindle may have an extended length greater than the depth of the center hole in the hub of the base, in which case, the spindle can be retractable into the cap against a spring which normally biases the spindle to its extended condition. The cap may have a concave underside closed by a stamp retainer, with the stamp element mounted to the underside of the retainer and the spindle extending through aligned holes in the retainer and the stamp element. A coil spring compressed between the cap and the spindle continuously biases the spindle to its extended position, and a stop on the spindle acts against the retainer for limiting extension of the spindle.

The inkwell which serves both as a cover or closure for the stamp unit and also contains an inked pad for inking the stamp. The inkwell may have one side adapted to make a retentive fit with the cap of the stamp unit for covering the stamp element and an opposite side containing an ink pad, with a removable cover over the ink pad. The inkwell may be divided by a partition between the two sides, with an aperture in the partition for admitting the spindle, an annular shoulder about the aperture, and the ink pad being perforated for mounting on the annular shoulder.

The base may take the form of a planar sheet of rigid material with the hub integrally formed thereon and preferably includes a spacer for supporting a compact disc on the hub away from contact with the upper surface of the base around the hub. The base, hub and spacer are preferably formed as an integral unit, and the center hole in the hub may extend fully through the hub and the base.

These and other features and advantages of the present invention will be better understood by turning to the following detailed description of the preferred embodiments taken with reference to the accompanying drawings.

BRIEF DESCRIPTION OF THE DRAWINGS

FIG. 1 is an axially exploded view of the stamping unit and base shown in axial alignment with a compact disc;

FIG. 2 is a cross-sectional view of the stamping unit;

FIG. 3 is an axially exploded cross-sectional view of the inkwell;

FIG. 4 is a bottom view of the stamping unit showing the raised stamping indicia of the stamp element;

FIG. 5 is a cross-sectional view of the inkwell assembled to the stamping unit;

FIG. 6 is a bottom plan view of a compact disc mounted to the base and showing the stamping unit in position for stamping the compact disc;

FIG. 7 is an elevational view taken in section along line 7—7 in FIG. 6; and

FIG. 8 is an elevational view taken in section along line 8—8 in FIG. 6.

DETAILED DESCRIPTION OF THE PREFERRED EMBODIMENTS

With reference to the drawings, FIG. 1 shows in diametric section a typical compact disc CD which has a center opening H for mounting the CD disc to the motor driven hub of a CD player. The CD disc has an upper-surface S1 and an undersurface S2. The undersurface S2 normally carries the digitally recorded audio or data, while the top surface S1 may have printed information such as the title of the album and an index of its contents. Typically, the upper surface has an inner area A which is free of printing, a base designated by the numeral 20 in FIGS. 1 and 6–8, and an inkwell designated by numeral 30 in FIGS. 3 and 5.

The stamping unit 10 is shown axially exploded in FIG. 1 and is seen to include a cap 12 which has an upper convex side and a lower concave side 14 with a central recess 16. A coil spring 18 is contained within a cylindrical pilot spindle 22 which has a closed lower end 24, an open upper end 26 and an annular stop 28 of enlarged radius. A stamp retainer 32 is a disc with an annular recess 34 on its underside and an annular shoulder 36 on its upper side. A stamp element 40 is a thin and narrow ring with raised stamping indicia 42. The stamp element 40 may be of rubber or equivalent, somewhat resilient material, and is retained in the annular slot 34 of the stamp retainer. The lower end 24 of the pilot spindle passes through a center hole 44 in the stamp retainer and extends below the stamp element 40. The upper end of spring 18 is captive in the cap recess 16 while the lower end of the spring is contained inside the pilot spindle 22. The Spring 18 is compressed between the cap and the spindle and biases the spindle to maximum extension below the stamp element, which is limited by engagement of the spindle stop 28 with the upper edge 46 of the annular shoulder 36. The stamp retainer 32 is affixed to the underside 14 of the cap 12, either in a close friction fit or by means of an adhesive. The annular shoulder 36 fits into the central recess 16, while the stamp retainer disc is mounted flush with the lower edge 15 of the cap 12, all as best seen in FIG. 2 where the stamping unit 10 is shown in its fully assembled, operative condition.

The base 20 has an elongated rectangular base strip 50 of sufficiently rigid sheet material, as best understood by reference to FIGS. 6-8. Centered in the base strip 50 is a circular hub 52 with an outer diameter sized to make a close fit in the hub opening H of the compact disc CD. A low circular step 54 surrounds the hub 52, and acts as a spacer to support the compact disc CD above and away from contact with the upper surface of the base sheet 50. As best seen in FIG. 1, the base including the base sheet 50, spacer step 54 and hub 52 are formed integrally, as by injection molding of thermoplastic material. The hub 52 has a pilot hole 56 which is sized to admit the pilot spindle 22. The base cooperates with the cap assembly such that when the disc CD is mounted on the hub 52, the pilot spindle 22 may be inserted into the pilot hole 56 so as to position and guide the stamp element 40 in relation to the disc CD, with the object of ensuring consistent placement of the stamping indicia 42 within the annular area A concentrically with the disc center, as shown in FIGS. 6 through 8.

The third component of the compact disc stamping kit of this invention is an inkwell 30 shown disassembled in FIG. 3. The inkwell has an inkwell housing 60 which has a cylindrical outer wall 62 internally divided by a partition 64 into a stamp receiving cavity 66 and an ink pad receptacle 68. An annular shoulder 70 is centered in the partition 64 around a central spindle aperture 72. An ink pad disc 74 of suitable ink absorbent material is pressed into the receptacle 68, with the annular shoulder 70 fitting into a hole 76 centered in the ink pad. A cover 78 fits closely around the lower rim 82 of the inkwell housing to cover the ink pad 74 and preserve the ink against evaporation. When not in use, the stamping unit 10 mates into the cavity 66 of the inkwell housing in a manner illustrated in FIG. 5. The pilot spindle 24 is received in the spindle aperture 72, while the rim 15 of the cap 12 fits inside the cylindrical wall 62, to both protect the stamp element 40 and prevent accidental smudging by the stamp indicia 42 when the stamp is not in use. The assembled stamping unit and inkwell form a compact unit which can be easily carried in a pocket or stored ready for use without concern for smudging other objects with ink.

When it is desired to stamp a compact disc CD, the disc is mounted on the hub 52 of the base 20. The stamping unit 10 is separated from the inkwell 30, and the inkwell cover 78 is removed to expose the ink pad 74. The pilot spindle 24 is inserted into the hole 72 on the ink pad side of the inkwell, which centers and guides the stamp element 40 against the ink pad. The stamp indicia 42 are lightly pressed against the ink pad 74 so as to transfer ink onto the stamp indicia 42. The stamping unit 10 is then separated from the inkwell 30 and moved into position over the mounted disc CD. The lower end 24 of the pilot spindle 22 is fitted into the hub center hole 56, which positively positions the stamp indicia 42 in relation to the area A on the disc. An impression is then made on the disc CD by lightly pressing the stamping unit 10 against the disc, so that ink on the stamp indicia 42 is transferred onto the disc surface A.

The center hole 56 in the base extends through the base, i.e. it is open on the underside of the base. The normal extended length of the pilot spindle 22, measured from the stamp element 40 to the spindle end 24 is slightly greater than the thickness of the base 20 measured between the undersurface 53 and the top surface of the center hub 52. In normal use, the base 20 will be positioned on a suitable supporting surface, such as a table top. When the spindle 22 is inserted into the hole 56 and pressed against the disc CD, the spindle 22 will pass through the thickness of the base 20 and contact the underlying supporting surface. Due to the greater extended length of the spindle 22, this will occur before the stamp indicia 42 have made contact with the disc CD. At this point, additional manual downward pressure is applied to the cap 12 to overcome and compress the biasing spring 18, slightly retracting the pilot spindle 22 into the cap 12 to allow application of the stamp indicia 42 to the disc surface A, as shown in FIGS. 7 and 8.. The spring 18 acts as a cushion and provides a measure of tactile feedback to avoid excessive force being applied against the disc CD during the stamping operation.

While certain preferred embodiments of the invention have been described and illustrated for purposes of clarity and example, it must be understood that many changes, substitutions, and modifications to the described embodiments will become obvious to those possessed of ordinary skill in the art without thereby departing from the scope and spirit of the present invention which is defined by the following claims.

What is claimed is:

1. An identification stamp for use on compact discs having a central opening for mounting to the hub of a player, comprising:
   a base including a hub sized to fit closely into the central opening of a compact disc, and a center hole in said hub; and
   a stamping unit having a cap, a pilot spindle extending from an underside of said cap and sized to fit closely into said center hole, and a stamp element about said spindle on said underside;
   such that a compact disk can be mounted on the hub of the base and the stamping unit centered relative to the disc by insertion of the spindle into the center hole of the hub for making an identifying impression upon pressing said stamp element against a said disc;
   said pilot spindle having an extended length greater than the depth of said center hole, a spring biasing said spindle to an extended condition, said spindle being retractable into said cap against said spring.

2. The stamp of claim 1 further comprising an inkwell having a first side adapted to make a retentive fit with said cap for covering said stamp element, an inkpad in an opposite side of said inkwell, and a removable cover over said inkpad.

3. The stamp of claim 2 wherein said inkwell has a partition between said first and opposite sides, a center hub in said partition apertured for admitting said spindle, said inkpad perforated for mounting on said center hub.

4. The stamp of claim 1 wherein said cap has a concave underside, a stamp retainer closing said underside, said stamp element mounted to an underside of said retainer, said spindle extending through aligned holes defined in said retainer and said stamp element, said spring being compressed between said cap and said spindle, and a stop on said spindle acting against said retainer for limiting extension of said spindle.

5. The stamp of claim 1 wherein said base is planar and includes a spacer for supporting a said disc on said hub away from contact with said base.

6. The stamp of claim 5 wherein said base, said spacer and said hub are formed as an integrated unit.

7. The stamp of claim 6 wherein said center hole extends fully through said hub and said base.

8. An identification stamp for use on compact discs having a central opening for mounting to the hub of a player, comprising:

a base including a hub on an upper side of said base, said hub sized to fit closely into the central opening of a compact disc, and a center hole in said hub; and a stamping unit having a cap with a concave underside, a stamp retainer closing said underside, a stamp element mounted to an underside of said retainer, a pilot spindle slidably extending through aligned holes defined in said retainer and said stamp element, said spindle sized to closely fit into said center hole;

said base also having a spacer such that a compact disk can be supported on the hub of the base away from contact with said upper side and said stamping unit centered relative to the disc by insertion of the spindle into the center hole of the hub for making an identifying impression by pressing said stamp element against the disc.

9. The stamp of claim 8 wherein said base, said spacer and said hub are integrally molded of a plastic material.

10. The stamp of claim 8 wherein said center hole extends fully through said hub and said base, and said pilot spindle has an extended length beyond said stamp element greater than the depth of said center hole.

11. The stamp of claim 10 further comprising an inkwell having a first side adapted to retentively engage said cap for covering said stamp element, an inkpad on an opposite side of said inkwell, and a removable cover over said inkpad.

12. The stamp of claim 11 wherein said inkwell has a partition between said first and opposite sides, a spindle hole in said partition for admitting said spindle, an annular shoulder around said spindle hole on said opposite side of said partition, said inkpad being annular for mounting on said annular shoulder.

13. The stamp of claim 10 wherein said stamp element has raised indicia for making said impression on a said disc.

14. The stamp of claim 13 wherein said raised indicia extend annularly about said center spindle.

15. A kit for applying identifying markings to compact discs of the type having a central opening for mounting the disc to the hub of a player, said kit comprising:

a base including a hub sized to fit closely into the central opening of a compact disc, and a center hole in said hub; and a stamping unit having a cap, a pilot spindle extending from an underside of said cap and sized to fit closely into said center hole, and a stamp element about said spindle on said underside; and an inkwell having a first side adapted to make a retentive fit with said cap for covering said stamp element, an inkpad in an opposite side of said inkwell, a partition between said first and opposite sides, a hole through said partition and said inkpad for receiving said spindle, and a removable cover over said inkpad.

* * * * *